United States Patent Office.

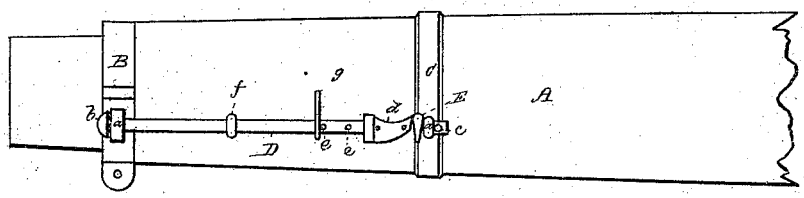

CHARLES S. BROWN, OF PITTSTON, MAINE.

Letters Patent No. 80,803, dated August 11, 1868.

IMPROVEMENT IN SUPPORTING-ATTACHMENT FOR SAILS.

*The Schedule referred to in these Letters Patent and making part of the same.*

TO ALL PERSONS TO WHOM THESE PRESENTS MAY COME:

Be it known that I, CHARLES S. BROWN, of Pittston, in the county of Kennebec, and State of Maine, have made a new and useful Invention for Supporting the Corners of the Head and Reef of a Square-Sail of a navigable vessel; and I do hereby declare the same to be fully described in the following specification, and represented in the accompanying drawings, of which—

Figure 1 is a top view of the end portion of a vessel's yard, as provided with my invention.

Figure 2 is a side elevation, and

Figure 3 an end view thereof.

Figure 4 is an outer side view of the adjustable head-hook.

Figure 5 is a side view of the reef-link, to be hereinafter described.

The usual mode of supporting the head of a square-sail renders its corners liable, particularly when the sail is wet, to hang loose, so as to cause the weight of the sail to be borne more or less on the canvas, instead of on the bolt-rope near the corner, and this renders the sail liable to be torn at this part of it. To hold the sail out taut, and properly sustain it at its corner, so that the strain may be on the bolt-rope thereof, is the main purpose of my invention, which may be thus described.

To the yard A, a little abaft of its upper edge, I apply, by means of projections $a\ a$, from two collars or rings, B C, encompassing the yard, what I term a runner, D, which consists of a round rod, a long bolt which goes through the projections $a\ a$, and has a head, $b$, arranged parallel to the yard, and at a short distance from it, the rod being provided near its end with a hole, going through it transversely, to receive a pin or wedge, $c$.

On this runner is placed a hook, E, which is provided with a brace or arm, $d$, to extend from it, in manner as represented. The runner goes through the hook and brace-arm, both of which slide and turn freely on the runner.

A series of holes is made laterally through the runner, as shown at $e\ e$, &c., such being to receive one or more pins for supporting the hook against the draught of the sail.

The runner, for better security, is also carried through an eye-bolt, $f$, inserted in the yard between the two collars. There is also on the runner a sliding link, $g$, whose purpose is to support the edge of the sail when a reef may be taken in it, such edge, at such part, being fastened to the link, while the upper corner of the sail may depend from the hook.

For the better security of the "mousing," and to keep the hook in connection with the sail, I form such hook with a hole, $h$, going laterally through its shank, and just below the curve $i$ in the tongue of the hook. The mousing, which goes across the part $i$ of the hook, instead of being carried around the shank of such hook, is to be passed through the hole $h$, whereas, were it carried underneath the shank, such mousing would be liable to be chafed or worn by contact with the yard.

The sail, at its upper corner, is to be hitched upon the hook, after which the hook is to be drawn or slid outward upon the runner until the slack of the sail is taken up. A pin should next be put through the runner, to hold the link in place.

I claim the combination of the adjustable hook E, and its runner D, with the yard A, such being to operate in manner and for the purpose specified.

CHARLES S. BROWN.

Witnesses:
R. H. EDDY,
F. P. HALE, Jr.